United States Patent
Yeh (10) Patent No.: US 9,223,100 B2
(45) Date of Patent: Dec. 29, 2015

(54) RETENTION MODULE FOR POSITIONING CONVERSION MODULE

(71) Applicant: HON HAI PRECISION INDUSTRY CO., LTD., New Taipei (TW)

(72) Inventor: Cheng-Chi Yeh, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 45 days.

(21) Appl. No.: 14/162,762

(22) Filed: Jan. 24, 2014

(65) Prior Publication Data

US 2014/0355938 A1    Dec. 4, 2014

(30) Foreign Application Priority Data

May 30, 2013    (TW) .............................. 102119035 A (51) Int. Cl.
  *G02B 6/42*    (2006.01)
(52) U.S. Cl.
  CPC ............ *G02B 6/4228* (2013.01); *G02B 6/4278* (2013.01); *G02B 6/4219* (2013.01); *G02B 6/4269* (2013.01)

(58) Field of Classification Search
  CPC ............................ G02B 6/4278; G02B 6/4228
  See application file for complete search history.

(56) References Cited

U.S. PATENT DOCUMENTS

2013/0071072 A1*    3/2013    Xie .................................. 385/92

FOREIGN PATENT DOCUMENTS

CN           102141654          11/2012

* cited by examiner

*Primary Examiner* — Jerry Rahll
(74) *Attorney, Agent, or Firm* — Wei Te Chung; Ming Chieh Chang (57) ABSTRACT

A retention module (100) for positioning conversion module (8) and a pair of fiber assemblies (7) matched with the conversion module (8) to transfer light signals, the conversion module (100) includes a plurality of pads (81) for contacting with an electrical connector (5) assembled on a substrate (80), the retention module (100) includes a seat (1) with a supporting portion (12) and a head portion (11), the supporting portion (12) includes a bottom wall (121) and a pair of sidewalls (120) to form a window (1203) for receiving the conversion module (8), the head portion (11) includes a top surface (110) higher than the bottom wall (121), a bottom surface (111) and a pair of recesses (1110) recessed from the bottom surface (111) for receiving the pair of fiber assemblies (7).

19 Claims, 7 Drawing Sheets

RETENTION MODULE FOR POSITIONING CONVERSION MODULE

BACKGROUND OF THE INVENTION

1. Field of the Invention

The present invention relates to a retention module, and more particularly to a retention module to position a conversion module for converting optical signal to electrical signal.

2. Description of Related Art

Chinese patent No. 102141654B issued to Xie on Nov. 28, 2012 discloses a conventional optical connector assembly for converting an optical signal to an electrical signal. The optical connector assembly includes a seat, a plurality of contacts received in the seat and a cover assembled on the seat and can be rotated from an opened position to a closed position. When used, an optical to electrical conversion module is assembled to the seat directly and electrically connects with the contacts, the cover be rotated to a closed position to make the optical to electrical conversion module positioned on the seat securely. The seat includes a sliding groove, and the cover includes a shaft received in the sliding groove. The optical connector assembly used a cover to position the optical to electrical conversion module, the operation process is complex. At the same time, when used more time, the shaft becomes slacked, which will affect the pressing force that the cover exerts on the optical to electrical conversion module.

Hence, it is desirable to provide a retention module for positioning the conversion module to overcome the aforementioned disadvantages.

SUMMARY OF THE INVENTION

Accordingly, an object of the present invention is to provide a retention module to position the conversion module for converting optical signal to electrical signal.

According to one aspect of the present invention, a retention module for positioning conversion module and a pair of fiber assemblies matched with the conversion module to transfer light signals, the conversion module includes a plurality of pads for contacting with an electrical connector assembled on a substrate, the retention module includes a seat with a supporting portion for supporting the conversion module and a head portion extending from the supporting portion, the supporting portion includes a bottom wall and a pair of sidewalls extending upwardly from two opposite sides of the bottom wall, the bottom wall and the pair of sidewalls form a window for receiving the conversion module, the head portion includes a top surface higher than the bottom wall of the supporting portion, a bottom surface opposite to the top surface and a pair of recesses recessed from the bottom surface to the inner of the head portion for receiving the pair of fiber assemblies.

Other objects, advantages and novel features of the invention will become more apparent from the following detailed description when taken in conjunction with the accompanying drawings, in which:

DETAILED DESCRIPTION OF THE INVENTION

Reference will now be made to the drawings to describe the present invention in detail.

Referring to FIGS. 1-2 and 4-5, the optical connector assembly 200 according to this invention includes an electrical connector 5, an interlock member 6 assembled on a substrate 80, a retention module 100, a conversion module 8 assembled on the retention module 100 for converting optical signal to electrical signal, a pair of fiber assemblies 7 assembled to the retention module 100 and match with the conversion modules 8 to transfer light signals, a heat sink 9 assembled on the conversion module 8 to dissipate heat generated by the conversion module 8 and a lever 10 to position the heat sink 9. The electrical connector 5 includes a plurality of contacts 51. The conversion module 8 includes a plurality of pads 81 locate one end thereof, a first recess 82 and a second recess 83 locate two sides perpendicular to the end of the conversion module 8. The pads 81 connect with the contacts 51 to establish electrical connection therebetween. Thus, the light signals sent by the fiber assembly 7 are converted to electrical signals by the conversion module 8. The retention module 100 includes a seat 1, a position member 2 assembled on the seat 1, a rod 3 for locating the position member 2 and a spring 4 assembled on the rod 3.

Figure 1:
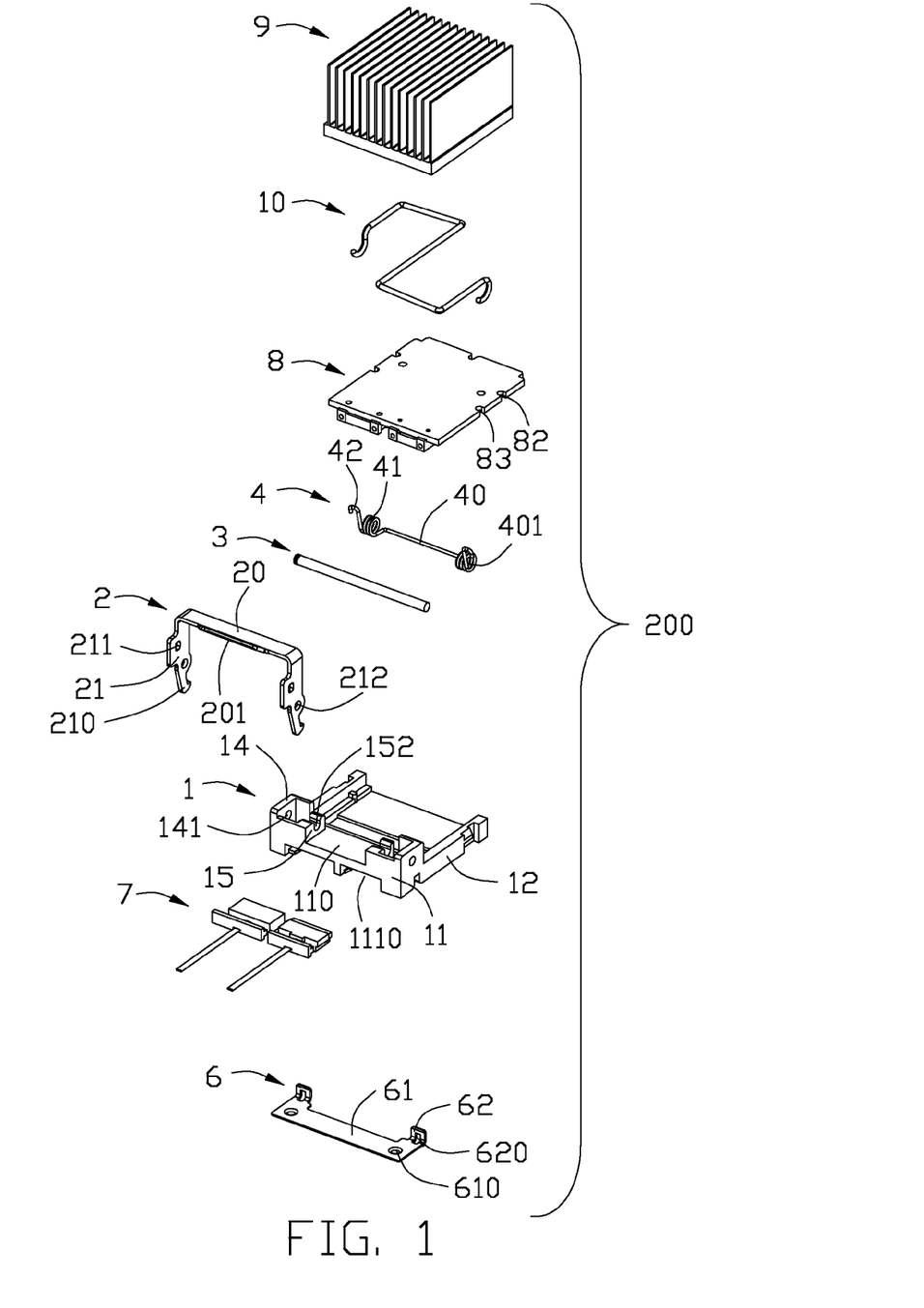
FIG. 1 is an exploded view of an optical connector assembly using the retention module according to a preferred embodiment of the present invention.
Figure 2:
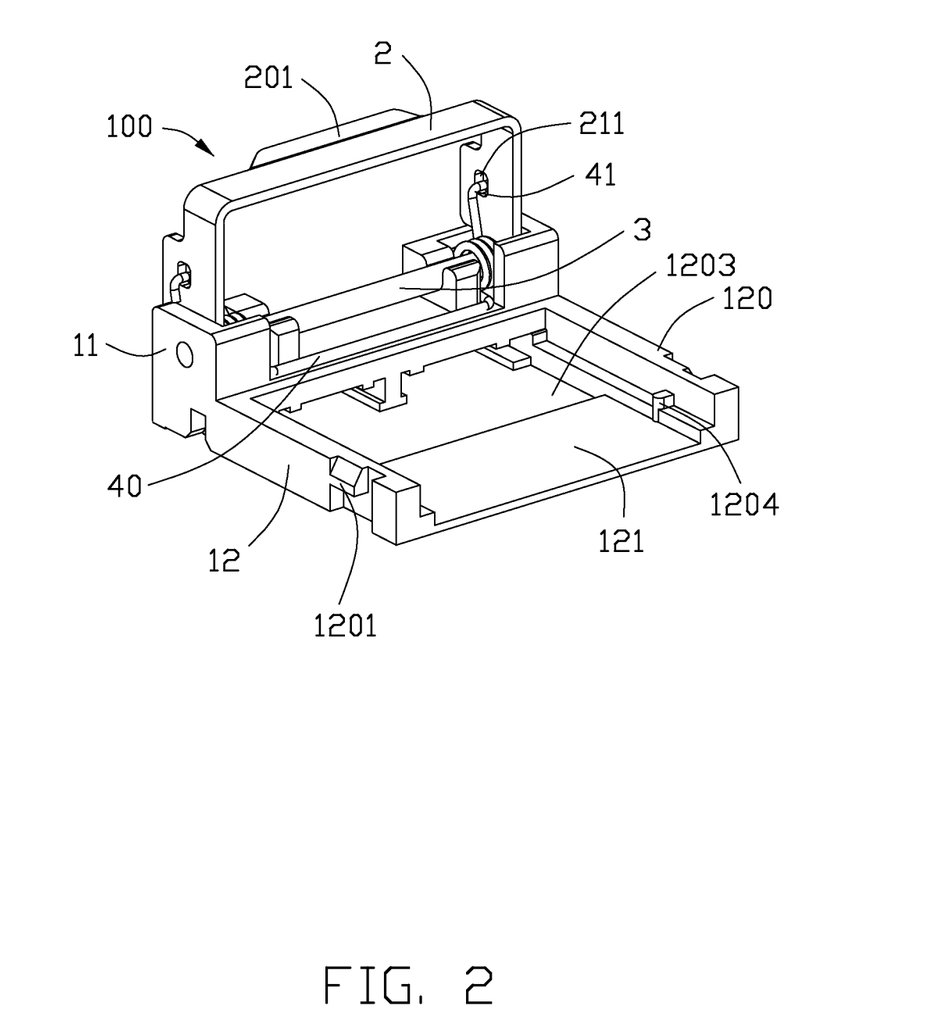
FIG. 2 is an assembled view of the retention module.
Figure 3:
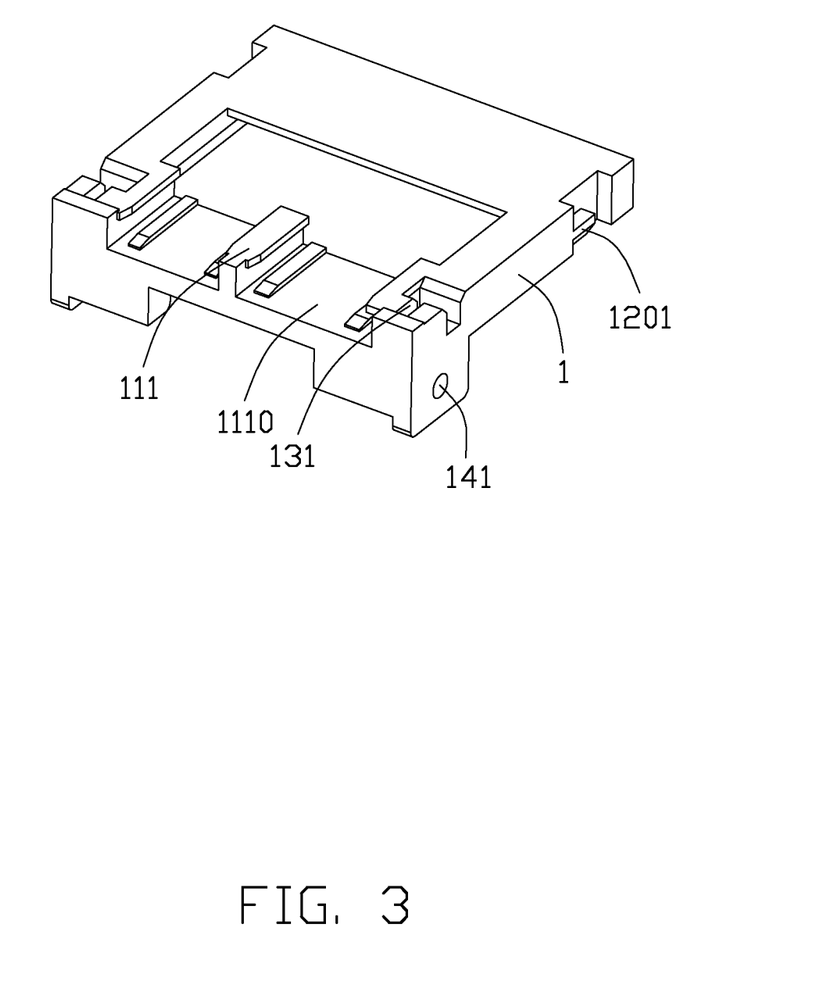
FIG. 3 is an isometric view of the seat of the retention module.

Referring to FIGS. 1-3, the seat 1 is made of plastic material and includes a supporting portion 12 and a head portion 11 extending from the supporting portion 12. The supporting portion 12 includes a bottom wall 121 and a pair of sidewalls 120 extending upwardly from the two opposite sides of the bottom wall 121. The bottom wall 121 and the pair of sidewalls 120 form a window 1203 for receiving the conversion module 8. Each of the sidewalls 120 includes a block 1201 and a projecting portion 1204 received in the second recess 83 of the conversion module 8. The head portion 11 includes a top surface 110 higher than the bottom wall 121 of the supporting portion 12, a bottom surface 111 opposite to the top surface 110, a pair of through holes 131 penetrating from the top surface 110 to the bottom surface 111, a retention wall 14 and a supporting wall 15 extending upwardly from the top surface 110, a pair of recesses or guiding channels 1110 recessed from the bottom surface 111 to the inner of the head portion 11. The pair of recesses 1110 is used to receive the pair of fiber assemblies 7. The retention wall 14 and the supporting wall 15 are set opposite to each other. The retention wall 14 includes a receiving hole 141, and the supporting wall 15 includes an indent 152. The spring 4 includes a body portion 40, a pair of assembling portions 41 extending from two opposite ends of the body portion 40 and a hook 42 extending from the assembling portion 41. The assembling portion 41 includes a passage 401.

The position member 2 is made of metal material and includes a main portion 20, a pair of position portions 21 extending from two opposite ends of the main portion 20 and a handle portion 201 extending from one side of the main portion 20. The position portion 21 includes a first hole 211, a second hole 212 and a fastening 210 located at the end of the position portion 21.

Figure 5:
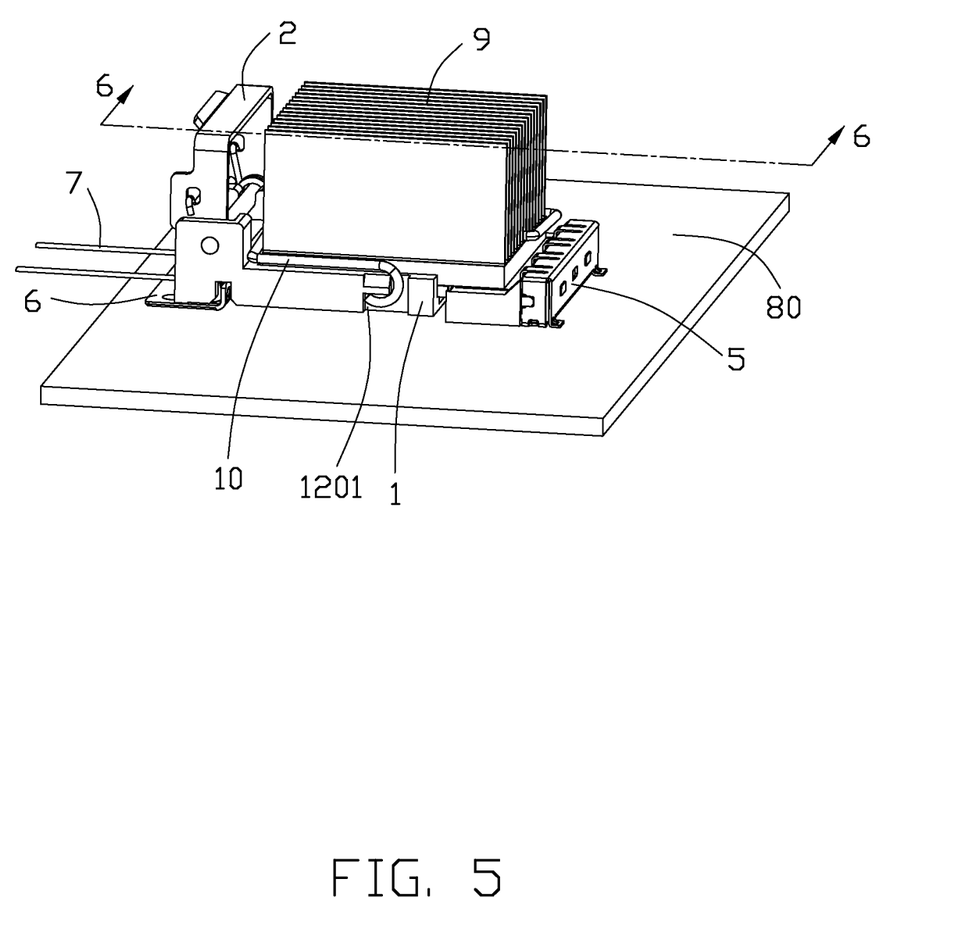
FIG. 5 is an assembled view of the optical connector assembly with the substrate.
Figure 6:
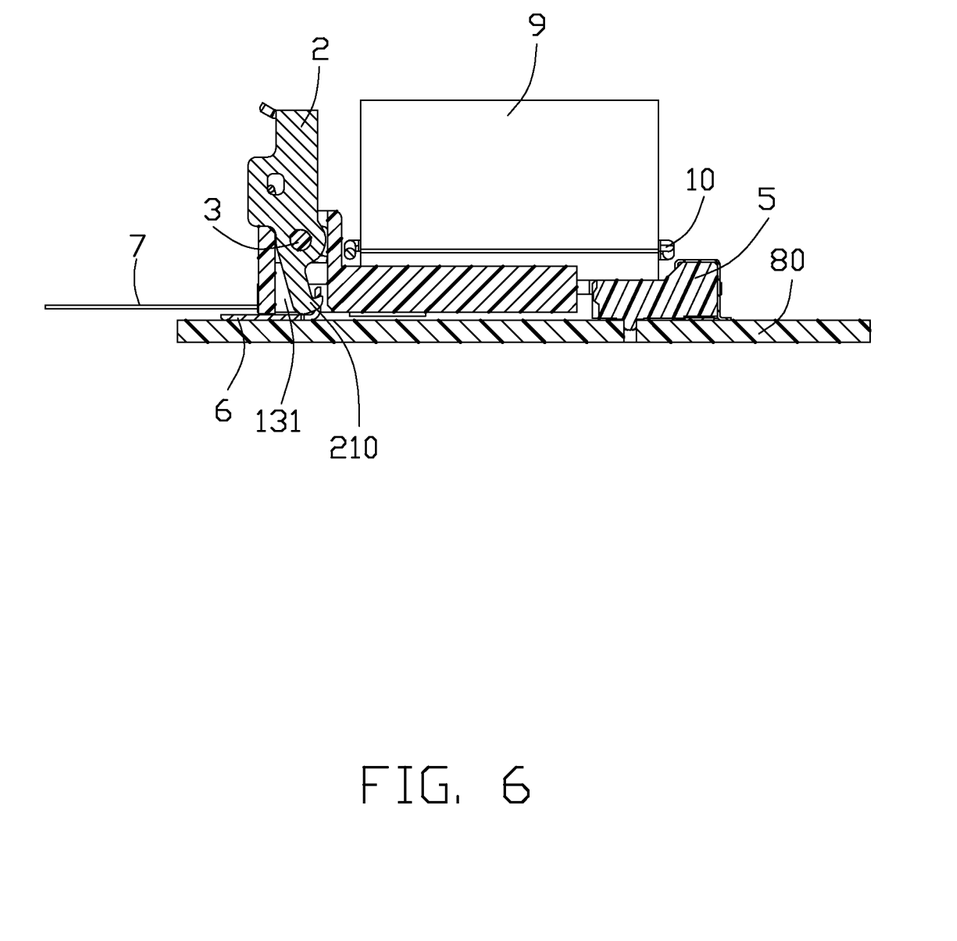
FIG. 6 is a cross-sectional view of the optical assembly along line 6-6 as showing in FIG. 5.
Figure 7:
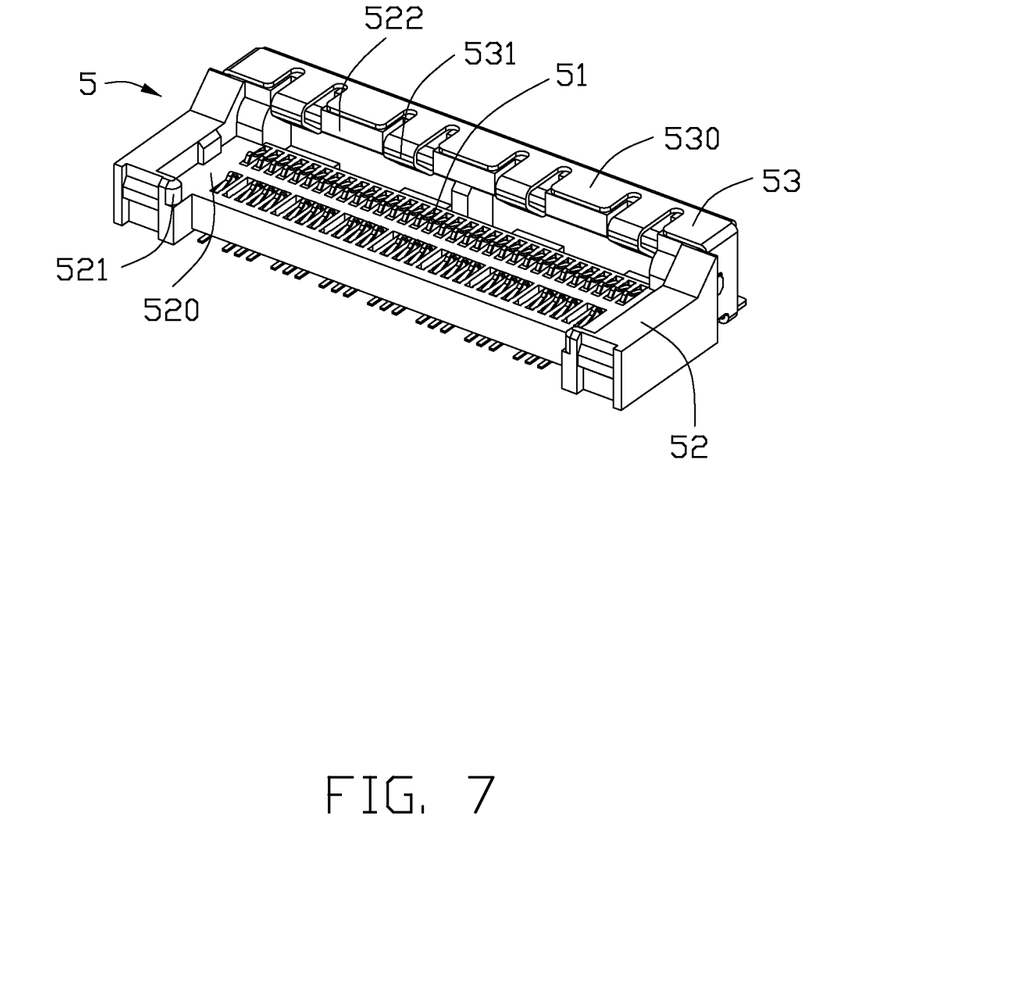
FIG. 7 is a perspective view of the electrical connector of the FIG. 1.

Referring to FIGS. 1, 5 and 6, the interlock member 6 is assembled on the substrate 80 and includes a plate body portion 61 and a pair of interlock portions 62 extending upwardly from the body portion 61. The body portion 61 includes a pair of posts 610. Each of the interlock portions 62 includes a slot 620.

When the retention module 100 is assembled, the hook 42 of the spring 4 goes through the first hole 211 of the position member 2 to make the spring 4 assembled with the position member 2; the position portion 21 of the position member 2 goes through the through hole 131 of the seat 1 to make the position member 2 being assembled to the seat 1; the rod 3 goes through the receiving hole 141 of the retention wall 14 of the seat 1, the second hole 212 of the position member 2, the passage 401 of the spring 4 and the indent 152 of the supporting wall 15 to make the rod 3, the spring 4, the position member 2 and the seat 1 be assembled together; the body portion 40 of the spring 4 is supported on the seat 1 to provide a spring force.

Referring to FIGS. 1 and 5-7, the electrical connector 5 comprises an insulative housing 52 to retained said the contacts 51 and a shielding shell 53 covering the insulative housing, the insulative housing 52 further defines a receiving portion 520 for receiving the conversion module 8, a pair of blocking portions 521 received in the first recess 82 of the conversion module 8 and a flange portion 522 extending into the receiving portion 500 for pressing an upper surface of the conversion module 8, and the shielding shell 52 including a boding portion 530 and a number of spring portions 530 extending from the boding portion 530 adjacent to the flange portion 521 of the housing for guiding the end of the conversion module 8 into the receiving portion 520 in an oblique manner.

Figure 4:
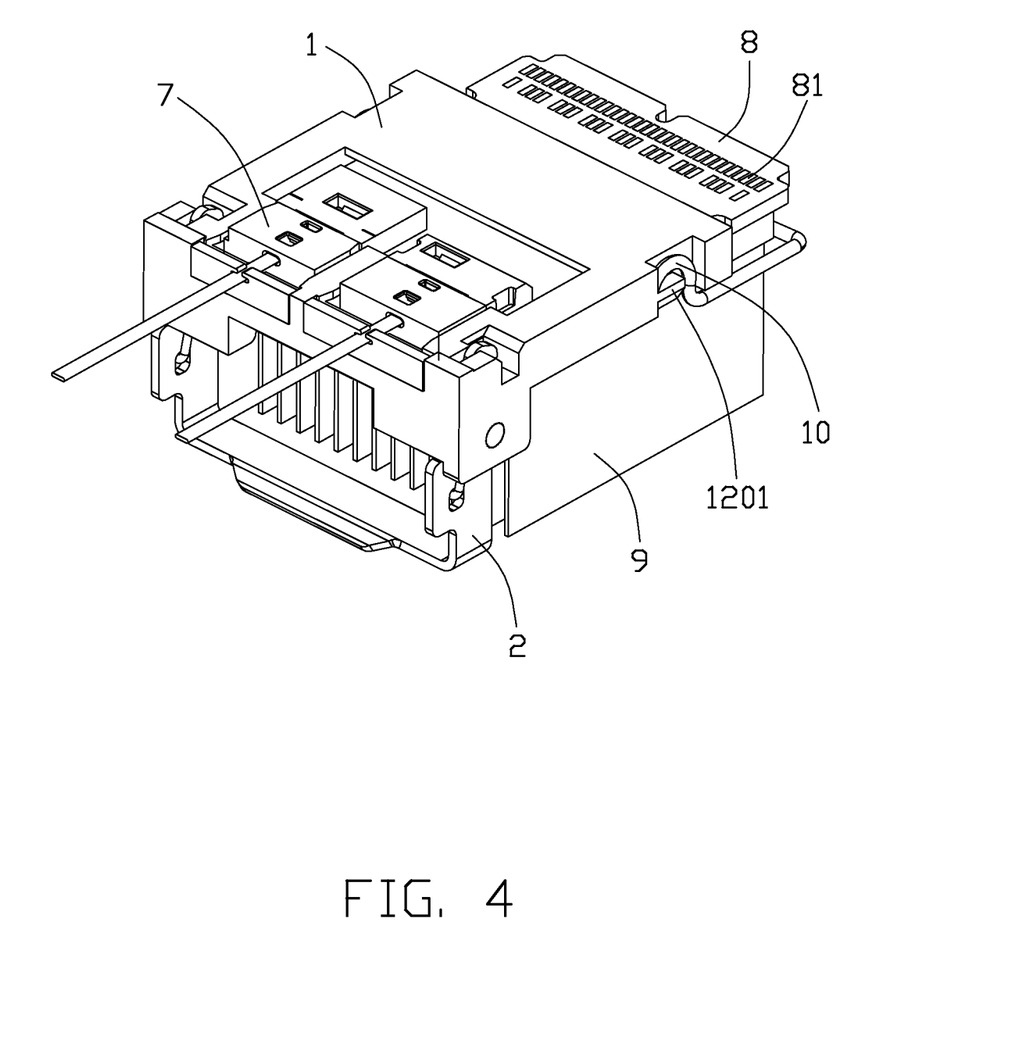
FIG. 4 is an assembled view of the retention module, the conversion module, the heat sink and the fiber assembly.

Referring to FIGS. 4-6, when the optical connector assembly 200 is used, the conversion module 8 is received in the window 1203 of the seat 1; the heat sink 9 is assembled on the conversion module 8; the lever 10 presses on the heat sink 9 and hook with the block 1201 of the seat 1 to position the lever 10 on the seat 1; the pair of fiber assemblies 7 are received in the pair of recesses 1110 of the seat 1, respectively; after assemble the conversion module 8 to the set 1, assemble the conversion module 8 to the electrical connector 5 in the oblique manner and rotate the conversion module 8 to a horizontal position, meanwhile, the upper surface of the conversion module 8 against an inner surface of the flange portion 522 of the housing 52 of the electrical connector 5, and the pair of blocking portions 521 guiding and received in the first recess 82 of the conversion module 8; at this position, the fastening 210 goes through the slot 620 of the interlock member 6 and hooks with the interlock member 6 to keep the conversion module 8 in the horizontal position to make the pads 81 of the conversion module 8 contact with the contacts 51 of the electrical connector 5. When need to remove the conversion module 8, push the handle portion 201 of the position member 2 to make the position member 2 move toward the body portion 40 of the spring 4, the fastening 210 will be detached from the interlock member 6, and the conversion module 8 can be removed.

In this embodiment, the fastening 210 of the position member 2 hooks with the interlock member 6 set on the substrate 8, also the fastening 210 of the position member 2 can hook with the substrate 8 directly or hook with other members to make the pads 81 of the conversion module 8 contact with the contacts 51 of the electrical connector 5.

While the preferred embodiments in accordance with the present invention has been shown and described, equivalent modifications and changes known to persons skilled in the art according to the spirit of the present invention are considered within the scope of the present invention as defined in the appended claims.

What is claimed is:

1. A retention module assembly for positioning conversion module and a pair of fiber assemblies matched with the conversion module to transfer light signals, the conversion module including a plurality of pads for contacting with an electrical connector assembled on a substrate, the retention module comprising:
a seat including a supporting portion for supporting the conversion module and a head portion extending from the supporting portion, the supporting portion including a bottom wall and a pair of sidewalls extending upwardly from two opposite sides of the bottom wall, the bottom wall and the pair of sidewalls forming a window for receiving the conversion module, the head portion including a top surface higher than the bottom wall of the supporting portion, a bottom surface opposite to the top surface and a pair of recesses recessed from the bottom surface to the inner of the head portion for receiving the pair of fiber assemblies; wherein
the retention module further includes a position member assembled to the seat, the position member can be rotated to lock with an interlock member to keep the conversion module in a horizontal position to electrically connect to the electrical connector on said substrate on which said interlock member is mounted opposite to the electrical connector.

2. The retention module assembly as claimed in claim 1, wherein the position member includes a main portion, a pair of position portions extending from two opposite ends of the main portion and a fastening located at the end of the position portion.

3. The retention module assembly as claimed in claim 2, wherein each of the position portions further includes a first hole and a second hole, the retention module further includes a rod goes through the second hole and a spring assembled to the rod, the spring goes through the first hole and hooks with the position portion, the spring further includes a body portion supported on the seat to provide a spring force.

4. The retention module assembly as claimed in claim 3, wherein the head portion includes a receiving hole for receiving the rod.

5. A retention module assembly for positioning conversion module and a pair of fiber assemblies matched with the conversion module to transfer light signals, the conversion module including a plurality of pads for contacting with an electrical connector assembled on a substrate, the retention module comprising:
a seat including a window for receiving the conversion module and a pair of recesses for receiving the pair of fiber assemblies;
a position member assembled to the seat;
a rod assembled to the seat and the position member for positioning the position member on the seat;
a spring assembled to the rod; and
an interlock member fixed on the substrate opposite to the electrical connector to interlock with the position member for keeping the conversion module in a horizon plane.

6. The retention module assembly as claimed in claim 5, wherein the position member includes a main portion, a pair of position portions extending from two opposite ends of the main portion and a fastening located at the end of the position portion for hooking with the interlock member.

7. The retention module assembly as claimed in claim 6, wherein each of the position portions further includes a first hole and a second hole, the rod goes through the second hole and the spring goes through the first hole and hooks with the position portion, the spring further includes a body portion supported on the seat to provide a spring force.

8. The retention module assembly as claimed in claim 7, wherein the seat includes a supporting portion for supporting the conversion module and a head portion extending from the supporting portion, the supporting portion including a bottom wall and a pair of sidewalls extending upwardly from two opposite sides of the bottom wall, the window is formed by the bottom wall and the pair of sidewalls.

9. The retention module assembly as claimed in claim 8, wherein the head portion includes a top surface higher than the bottom wall of the supporting portion and a bottom surface opposite to the top surface, the pair of recesses are recessed from the bottom surface to the inner of the head portion.

10. An optical module assembly comprising:
a printed circuit board defining an area;
an electrical connector positioned on one end of the area in a longitudinal direction;
a retention module mounted upon remaining portions of said area and including a position member to releasably lock said retention module upon the printed circuit board; and
a conversion module positioned upon the retention module and defining one end retained by and electrically connected to said electrical connector in a releasable manner, wherein
said conversion module is releasably secured to the retention module.

11. The optical module assembly as claimed in claim 10, wherein said electrical connector is configured to allow the end of said conversion module to be initially assembled thereto in an oblique manner and successively rotated to a horizontal position for securing to the printed circuit board via said position member.

12. The optical module assembly as claimed in claim 10, wherein the position member is pivotal between locking and unlocking positions.

13. The optical module assembly as claimed in claim 12, wherein said positioning member is equipped with a spring to constantly urge said position member to be in the locking position.

14. The optical module assembly as claimed in claim 10, wherein said position member is located around the other end of said conversion module in said longitudinal direction.

15. The optical module assembly as claimed in claim 10, wherein said conversion module is secured to the retention module via a lever cooperating with a heat sink seated upon the conversion module.

16. The optical module assembly as claimed in claim 10, wherein the conversion module defines optical mating port around the other end thereof in said longitudinal direction for coupling to an optical fiber assembly.

17. The optical module assembly as claimed in claim 16, wherein the retention module defines a guiding channel around the other end to guidably and protectively receive the optical fiber assembly therein.

18. The optical module assembly as claimed in claim 10, wherein a heat sink is seated upon the conversion module, and the position member extends upward with a tip around a same level with a top of said heat sink.

19. The optical module assembly as claimed in claim 10, further including an interlocking member mounted upon the other end of said area in said longitudinal direction to be interlocked with the position member when the position member is moved to the locking position.

* * * * *